US006385493B1

(12) United States Patent
Hennessey et al.

(10) Patent No.: US 6,385,493 B1
(45) Date of Patent: May 7, 2002

(54) COMPUTER CONTROLLED WINCH ASSEMBLY FOR STAGE

(75) Inventors: John M. Hennessey, Oakland, NJ (US); James S. Crossley, Randolph, VT (US)

(73) Assignee: Production Resource Group L.L.C., New Windsor, NY (US)

( * ) Notice: Subject to any disclaimer, the term of this patent is extended or adjusted under 35 U.S.C. 154(b) by 1 day.

(21) Appl. No.: 09/630,342

(22) Filed: Jul. 31, 2000

(51) Int. Cl.[7] .............................................. G05B 19/18

(52) U.S. Cl. ............................ 700/65; 700/56; 700/60; 700/61; 700/63

(58) Field of Search .............................. 700/60–61, 19, 700/56–57, 63, 65, 66, 302; 254/292, 276

(56) References Cited

U.S. PATENT DOCUMENTS

| | | | | | |
|---|---|---|---|---|---|
| 3,399,281 | A | | 8/1968 | Corl | 191/23 R |
| 3,439,132 | A | | 4/1969 | Weber | 191/35 |
| 3,892,299 | A | | 7/1975 | Kilburg | 191/29 R |
| 4,324,386 | A | * | 4/1982 | Gagnon et al. | 254/288 |
| 4,372,452 | A | | 2/1983 | McCord | 212/285 |
| 4,570,543 | A | | 2/1986 | Ishikura et al. | 104/300 |
| 4,606,527 | A | | 8/1986 | Ziller et al. | 254/336 |
| 4,636,962 | A | * | 1/1987 | Broyden et al. | 700/228 |
| 4,662,628 | A | | 5/1987 | Chatenay e´pouse Compagnone | 472/77 |
| 5,106,057 | A | | 4/1992 | Feller et al. | 254/334 |
| 5,138,953 | A | | 8/1992 | Horcher et al. | 105/149.2 |
| 5,361,565 | A | | 11/1994 | Bayer | 254/292 |
| 5,920,476 | A | | 7/1999 | Hennessey et al. | 700/17 |

* cited by examiner

*Primary Examiner*—Leo P. Picard
*Assistant Examiner*—Ryan Jarrett
(74) *Attorney, Agent, or Firm*—Pepe & Hazard LLP

(57) ABSTRACT

A stage installation for vertical movement of multiple stage elements has a computer controlled winch assembly comprising a support member having a channel, a platform adjacent the support member, electrical control and electrical power raceways in the channel, and a multiplicity of winches supported on the platform. The winches include a housing, a bidirectional servomotor, a rotating drum driven by the motor in either direction to haul or pay out cables operatively connected to the stage elements. Connectors are coupled to the electrical power and electrical control raceways, and a remote computer terminal transmits signals to the winches to initiate and terminate operation of the servomotor.

11 Claims, 5 Drawing Sheets

COMPUTER CONTROLLED WINCH ASSEMBLY FOR STAGE

BACKGROUND OF THE INVENTION

The present invention relates to stage installations and, more particularly, to winch assemblies for vertical movement of stage elements.

Staging of various productions frequently requires vertical movement of backdrops and various stage elements. Although arbors or counterbalances are used to reduce the amount of effort required to effect such movement, manual operation of the hauling lines requires strength and endurance, and frequently the movement is irregular and not precise. Winches are sometimes used to provide mechanical advantage, and electrically powered winches have been utilized in some installations. Productions have been becoming more complex with multiple scenic elements to be moved rapidly and precisely. The costs of stagehands to manipulate the hauling lines has been increasing.

In recent years, various stage operations have been transferred to computer controls, such as lighting and lateral motion of props.

It is an object of the present invention to provide a novel stage installation in which scenic units are moved rapidly and precisely under control of a remote computer.

It is also an object to provide such a stage installation in which computer controlled electrically driven winches may be clustered to effect the movement of scenic units.

Another object is to provide such a stage installation in which the computer controlled winches may be installed relatively quickly and easily, and wherein a computer program will effect smooth and reliable movement of the stage units.

SUMMARY OF THE INVENTION

It has now been found that the foregoing and related objects may be readily attained by a computer controlled winch assembly in a stage installation having a multiplicity of elements to be moved vertically. The winch assembly has a support member having a channel, a platform adjacent the support member, an electrical control raceway and an electrical power raceway in the channel, and a multiplicity of winches supported on the platform. Each of the winches includes a housing, a bidirectional servomotor in the housing, a rotating drum coupled to the servomotor to effect its rotation in either direction to haul or pay out a cable extending thereabout and operatively connected to an element to be lifted and lowered as the drum is rotated.

A connector is coupled to the electrical power raceway to provide power to the servomotor for its rotation, and a connector is coupled to the electrical control raceway to receive signals from a remote computer control to initiate and terminate operation of the servomotor.

Each of the winches includes a microprocessor receiving signals from the remote computer control and controlling operation of the servomotor, and each of the microprocessors has a unique address to which signals from the computer control are directed. The microprocessor also generates signals transmitted to the remote computer control through the electrical control raceway, and it amplifies and varies the electrical power supplied to the servomotor.

Each winch housing includes means securing it to the support member, and the installation includes cables wound about the drums and connected to arbors and cables or lines connected to stage elements to be moved thereby and to the arbors. The drum has ring gears on each end thereof engaged with a pair of pinion gears driven by a planetary gear rotated by the shaft of the servomotor.

The stage installation includes a computer control and power and electrical control cables connected to the raceways, with the electrical control cable being operatively connected to the computer control.

DETAILED DESCRIPTION OF THE PREFERRED EMBODIMENT

Figure 1:
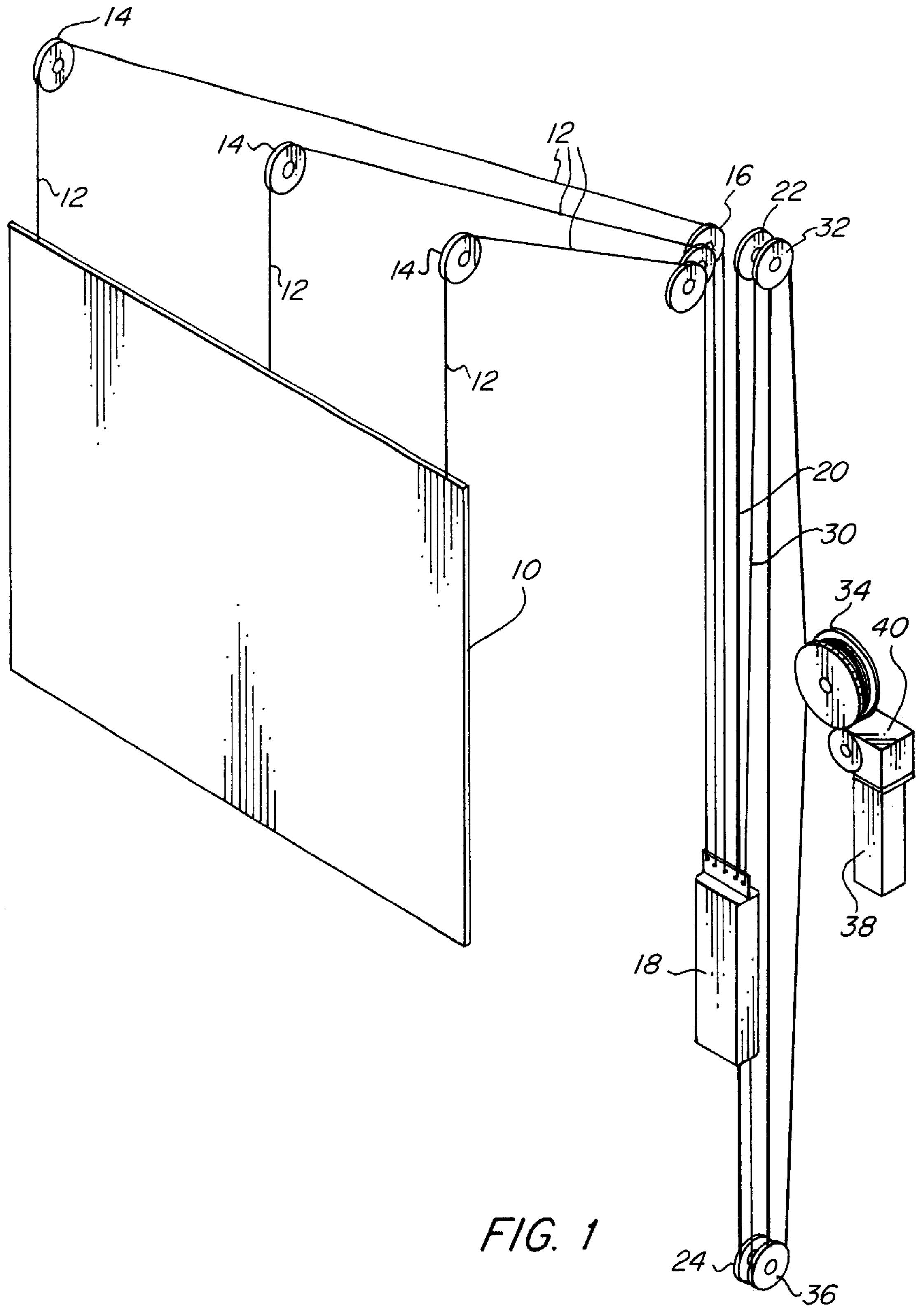
FIG. 1 is a schematic illustration of a typical stage installation including the operative elements of a single winch in the winch assembly of the present invention.

Turning first to FIG. 1, the electrical drive component of a winch assembly has been added to a typical stage installation with a scenic element or unit 10 supported on the loft lines 12 which extend upwardly to and about loft blocks or pulleys 14 and thence horizontally to and about head blocks or pulleys 16. They then extend downwardly and are attached to an arbor or counterweight 18. The arbor 18 has a fiber rope hauling line 20 extending upwardly to the head block 22 and thence downwardly to a foot block 24 and upwardly to the arbor 18. The arbor 18 and head and foot blocks are generally situated at a location on the side of the stage. The hauling line 20 is manually pulled to move the arbor 18, and thereby the scenic unit 10 up and down.

In place of the manually operated hauling line illustrated, the scenic unit 10 may be moved vertically under control of a computer 80 (seen in FIG. 5) by a motorized winch, only parts of which are shown. A wire rope 30 is attached to the top of the arbor 18 and extends upwardly and to the head block 32 and thence downwardly to and about the drum 34 of the winch, down to the foot block 36 and up to the bottom of the arbor 18. Obviously, the hauling line 20 and blocks 22, 24 would not be required when such a winch installation was employed.

The drum is rotated in either direction by the motor 38 through the gear drive 40 and either vertical leg of the wire rope 30 may be wound on the drum 34.

Figure 2:
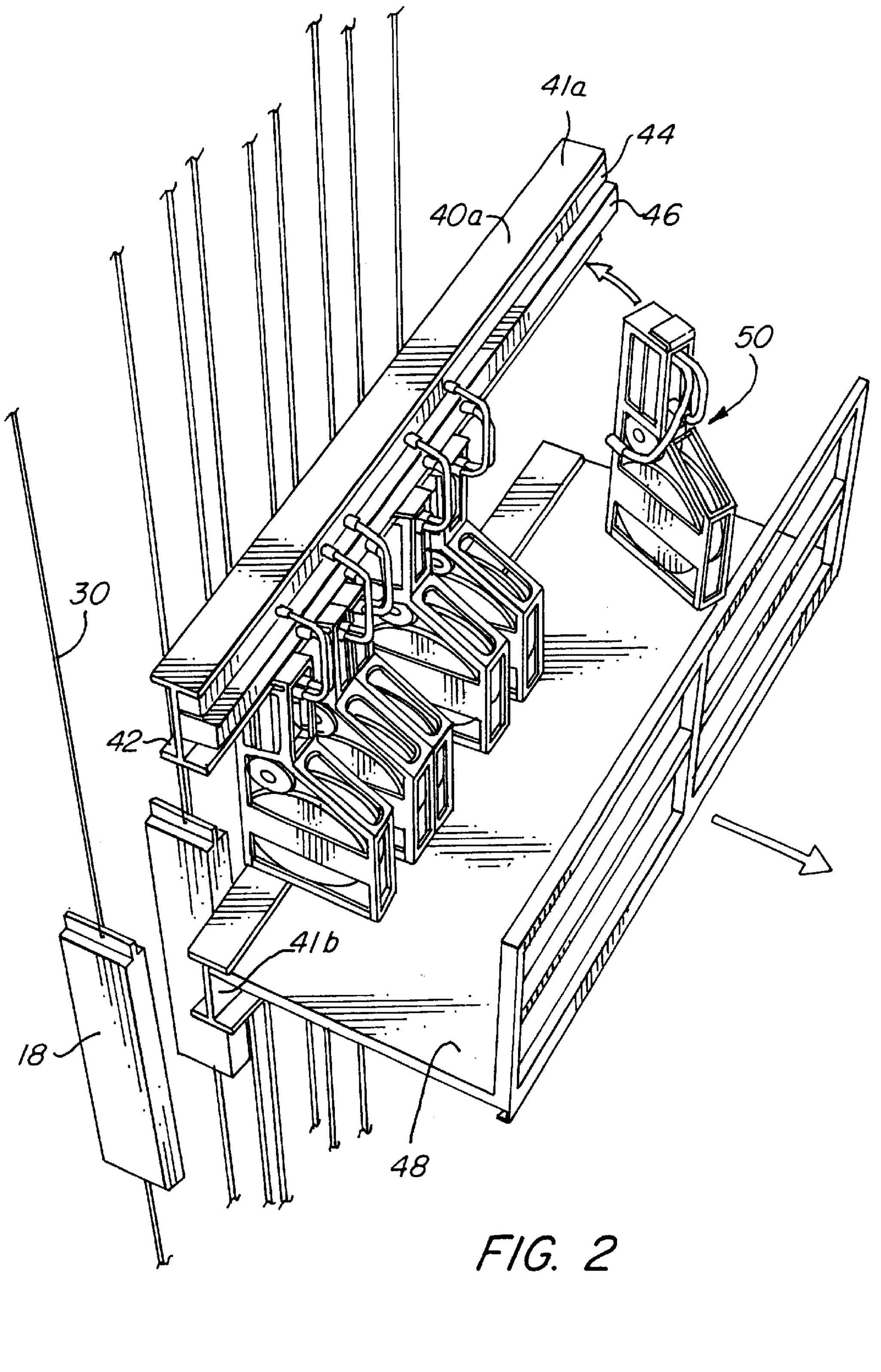
FIG. 2 is a schematic illustration of a winch assembly embodying the present invention with fragmentarily illustrated elements.

Turning next to FIG. 2, a winch assembly embodying the present invention has a pair of vertically spaced horizontal rails or beams 41, preferably of I shaped configuration. In the channel 42 of the upper rail 41*a* extend an electrical power raceway 44 and an electrical control raceway 46. A platform or catwalk 48 is positioned adjacent and between the rails 41 and has seated thereon a series of winches generally designated by the numeral 50. The wire ropes or cables 30 secured to the arbors 18 are wound about the drums of the winches 50 and extend through head blocks and foot blocks (not shown), as in FIG. 1.

Figure 3:
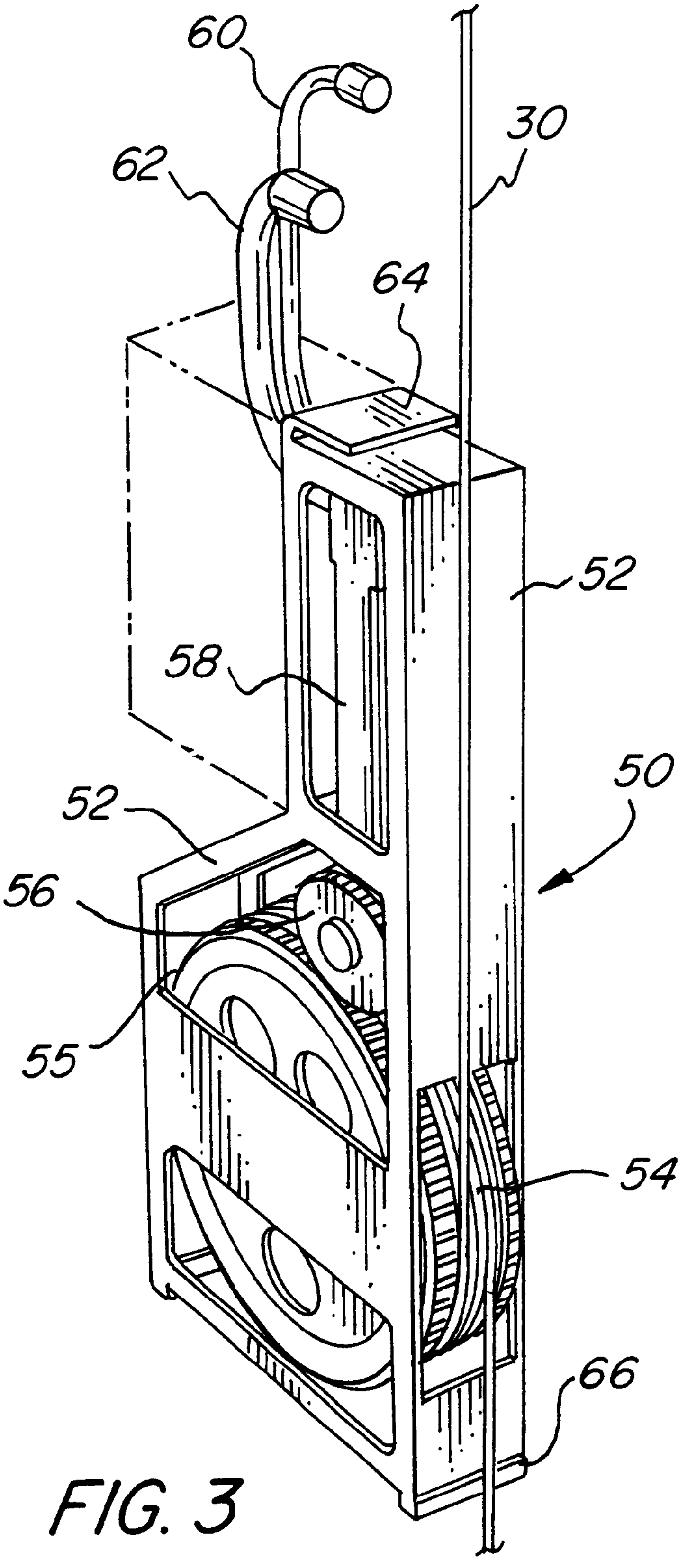
FIG. 3 is a perspective view of a winch utilized in the stage installation with the cables fragmentarily illustrated.

Turning next to FIG. 3, the winch 50 has a housing 52 in which are rotatably seated a grooved drum 54 which has ring gears 55 at each end and a pair of pinion gears 56 which are engaged therewith. A servomotor unit 58 in the upper end of the housing 52 and has a planetary gear (not shown) on its shaft (not shown) which is drivingly engaged with the pinion gears 56. Extending from the servomotor unit 58 are a power cable 60 which is plugged into the electrical power raceway 44 and a control cable 62 which is plugged into the control raceway 46.

Clips 64 at the top and bottom of the housing 52 (only the upper is shown) grip the rail 40*a* to position the winch 50. A plastic bearing block 66 on the bottom of the housing facilitates sliding the winches 50 along the platform 48 to a position adjacent the desired wire rope 30. As can be seen, the drum 54 projects outwardly of the housing 52 so that the wire rope 30 can feed into and pay off and be spaced from the housing 52.

Figure 4:
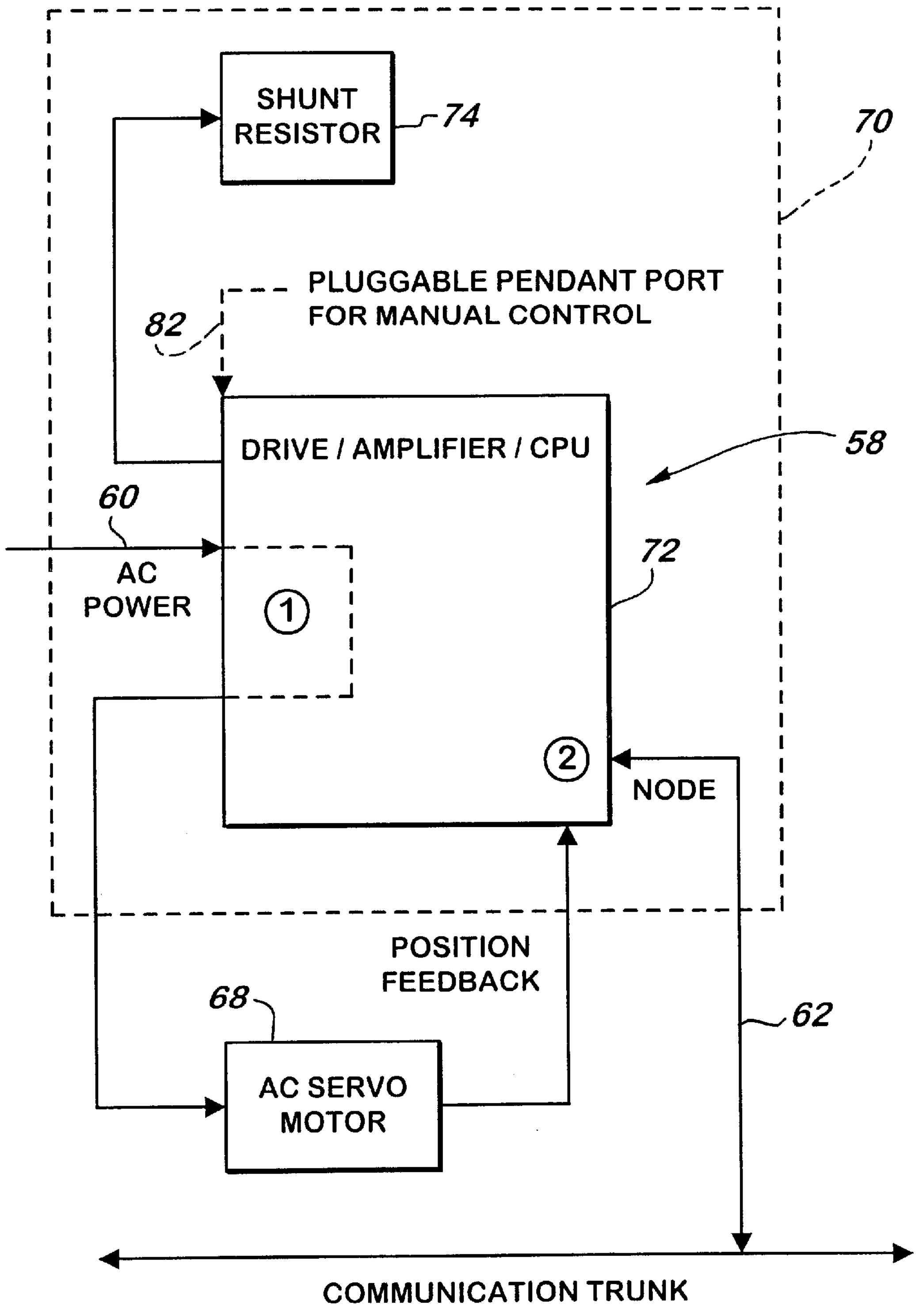
FIG. 4 is a schematic illustration of the electrical and electronic elements of the winch.

In FIG. 4, the servomotor unit 58 is seen to include not only the servomotor 68, but also a control circuit 70 including a microprocessor/amplifier 72 and a shunt resistor 74. The power and control cables connect to the microprocessor/amplifier 72 which has a unique digital address. The power input can be amplified and output to the brushless servomotor 68 with a sinusoidal waveform. A signal including the proper digital address will cause the motor 68 to operate and effect raising or lowering of the scenic unit. The motor 68 will produce a position feed back which the microprocessor 72 can provide as a signal to the computer control 80. The servomotor unit 58 desirably includes a port 82 into the control circuit to permit manual control of the winch 50, particularly during setup and programming of the computer control 80.

Figure 5:
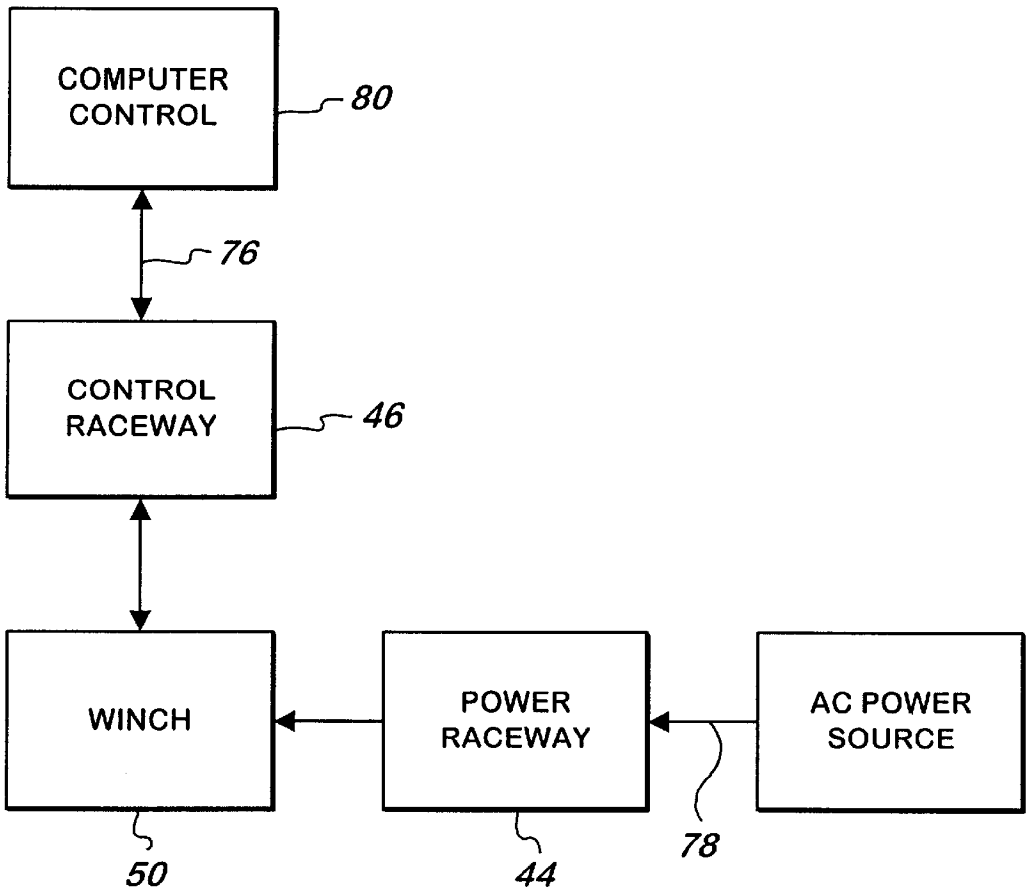
FIG. 5 is a schematic illustration of the electrical and electronic elements of the installation.

The overall circuitry is illustrated in FIG. 5 and is completed by the power cable 78 from the raceway 44 to an AC power source and the communication cable 76 from the raceway 46 to the remote computer control 80.

The microprocessor in the winch provides the communication protocol and sufficient memory for storage of the data for a number of indexed movements which may be required for the controlled scenic unit during a performance, and these may be coded. The signal from the computer control includes the code for the desired indexed movement. Thus, in the initial setup of the staging, the winch may be manually controlled through the manual port and the data from the motion may be written to the memory and the index code communicated to the computer control.

Although the computer control will normally provide pre-programmed instructions, the operator may override the programmed instructions if so desired.

As will be appreciated, the illustrated winch includes a redundant drive for the drum to ensure proper operation, and the two stage gear drive uses a low ratio primary gear head to provide a low torque, high speed output which enables a gear drive of relatively small dimension. As a result, the winch package may be six inches in width and even smaller depending upon the power requirements.

Thus, it can be seen from the foregoing detailed description and attached drawings that the novel stage installation of the present invention enables facile and reliable vertical movement of staging and props under programmed computer control. The powered and microprocessor controlled winches utilize long lived power units and may be readily moved and installed.

Having thus described the invention what is claimed is:

1. In a stage installation having a multiplicity of elements to be moved vertically, a computer controlled winch assembly comprising:

(a) a support member having a channel;

(b) a platform adjacent said support member;

(c) an electrical control raceway in said channel;

(d) an electrical power raceway in said channel;

(e) a multiplicity of winches supported on said platform, each of said winches including:

(i) a housing;

(ii) a bidirectional servomotor in said housing;

(iii) a rotating drum coupled to said servomotor for effecting its rotation in either direction to haul or pay out a cable extending thereabout and operatively connected to an element to be lifted and lowered as the drum is rotated;

(iv) a connector coupled to said electrical power raceway to provide power to said servomotor for its rotation; and (v) a connector coupled to said electrical control raceway to receive signals from a remote computer control to initiate and terminate operation of said servomotor.

2. The stage installation in accordance with claim 1 wherein each of said winches includes a microprocessor receiving signals from the remote computer control and controlling operation of said servomotor.

3. The stage installation in accordance with claim 2 wherein each of said microprocessors has a unique address to which signals from the computer control are directed.

4. The stage installation in accordance with claim 2 wherein said microprocessor generates signals transmitted to the remote computer control through said electrical control raceway.

5. The stage installation in accordance with claim 2 wherein said microprocessor amplifies and varies the electrical power supplied to said servomotor.

6. The stage installation in accordance with claim 1 wherein each of said winch housings includes means securing it to said support member.

7. The stage installation in accordance with claim 1 wherein said installation includes cables wound about said drums and having their ends connected to arbors and other cables connected between the arbors and the stage elements to be moved thereby.

8. The stage installation in accordance with claim 1 wherein said stage installation includes power and electrical control cables connected to said raceways, and a computer control, and wherein said electrical control cable is operatively connected to said computer control.

9. The stage installation in accordance with claim 8 wherein said winches are provided with microprocessors having unique addresses and wherein said remote computer control is adapted to send signals including said unique address to each of said multiplicity of winches to effect its operation.

10. The stage installation in accordance with claim 9 wherein said microprocessors are adapted to amplify and vary the electrical power supplied to said servomotor and to generate signals for transmission to said computer control indicative of movement of the stage elements to which said winches are operatively connected.

11. The stage installation in accordance with claim 1 wherein said drum has ring gears on each end thereof engaged with pinion gears driven by a planetary gear rotated by said servomotor.

* * * * *